US008459565B2

(12) United States Patent
Wang et al.

(10) Patent No.: US 8,459,565 B2
(45) Date of Patent: Jun. 11, 2013

(54) TWO-DIMENSIONAL CODE GENERATING APPARATUS, IMAGE FORMING SYSTEM, TWO-DIMENSIONAL CODE READING APPARATUS, AND COMPUTER READABLE MEDIUM

(75) Inventors: Chuan Wang, Shaanxi (CN); Takeshi Ohnishi, Ashigarakami-gun (JP)

(73) Assignee: Fuji Xerox Co., Ltd., Tokyo (JP)

( * ) Notice: Subject to any disclaimer, the term of this patent is extended or adjusted under 35 U.S.C. 154(b) by 252 days.

(21) Appl. No.: 12/728,305

(22) Filed: Mar. 22, 2010

(65) Prior Publication Data
US 2011/0049244 A1 Mar. 3, 2011

(30) Foreign Application Priority Data
Aug. 27, 2009 (JP) .................................. 2009-196639

(51) Int. Cl.
*G06K 19/06* (2006.01)
(52) U.S. Cl.
USPC ....... 235/494; 235/454; 235/462.09; 235/487
(58) Field of Classification Search
USPC ................. 235/454, 462.09, 462.1, 487, 494
See application file for complete search history.

(56) References Cited

U.S. PATENT DOCUMENTS

| 5,449,895 A * | 9/1995 | Hecht et al. .................... 235/494 |
| 5,449,896 A * | 9/1995 | Hecht et al. .................... 235/494 |
| 5,541,396 A * | 7/1996 | Rentsch ......................... 235/454 |
| 5,866,895 A * | 2/1999 | Fukuda et al. ................. 235/494 |
| 6,116,507 A * | 9/2000 | Fukuda et al. ................. 235/454 |
| 6,131,807 A * | 10/2000 | Fukuda et al. ................. 235/494 |
| 6,820,807 B1 * | 11/2004 | Antognini et al. ............. 235/454 |
| 7,106,357 B2 * | 9/2006 | Fukuda et al. .............. 348/14.02 |
| 2006/0289661 A1 * | 12/2006 | Bian .............................. 235/494 |

FOREIGN PATENT DOCUMENTS

| EP | 0672994 A1 | 9/1995 |
| JP | 8-235332 A | 9/1996 |
| JP | 2938338 B2 | 6/1999 |
| JP | 2952170 B2 | 7/1999 |
| JP | 2006-85679 A | 3/2006 |

* cited by examiner

*Primary Examiner* — Ahshik Kim
*Assistant Examiner* — Paultep Savusdiphol
(74) *Attorney, Agent, or Firm* — Sughrue Mion, PLLC

(57) ABSTRACT

According to an aspect of the invention, a two-dimensional code generating apparatus includes a two-dimensional code generating unit. The two-dimensional code generating unit that generates a two-dimensional code including a plurality of region symbols, a plurality of first pattern symbols, a plurality of second pattern symbols, and an information pattern. The region symbols represent a rectangular region in which one unit of the two-dimensional code is disposed, the rectangular region having a first side and a second side opposed to the first side.

12 Claims, 11 Drawing Sheets

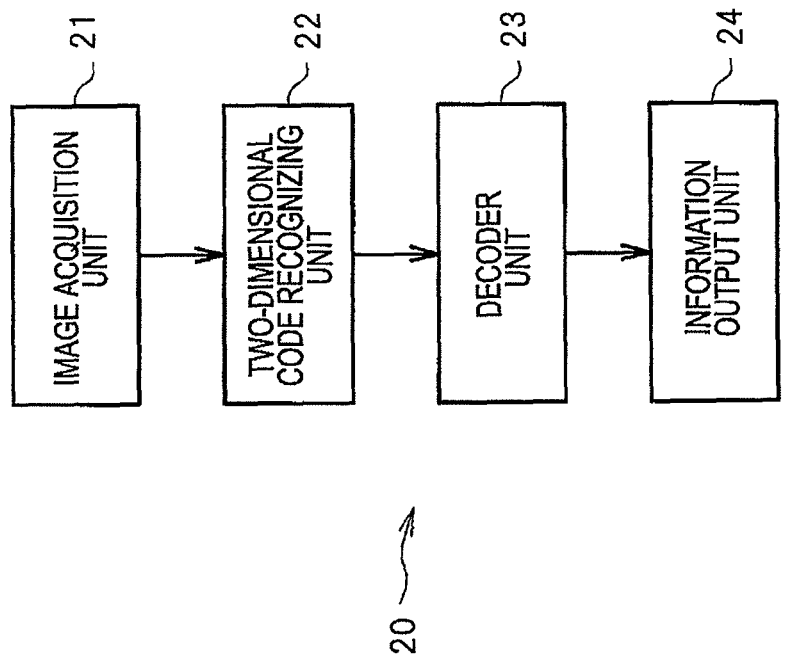
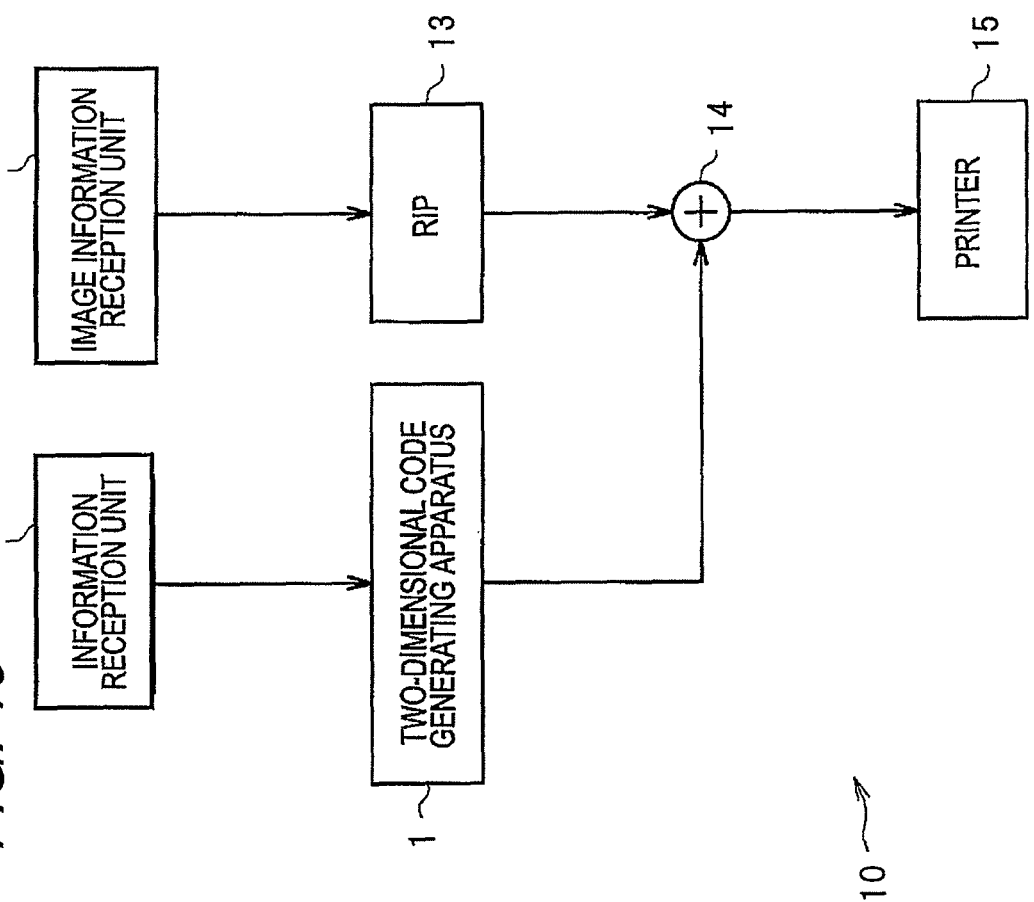

TWO-DIMENSIONAL CODE GENERATING APPARATUS, IMAGE FORMING SYSTEM, TWO-DIMENSIONAL CODE READING APPARATUS, AND COMPUTER READABLE MEDIUM

CROSS-REFERENCE TO RELATED APPLICATIONS

This application is based upon and claims priority under 35 USC 119 from Japanese Patent Application No. 2009-196639, filed Aug. 27, 2009.

BACKGROUND

Technical Field

The present invention relates to a two-dimensional code generating apparatus, an image forming system, a two-dimensional code reading apparatus, and a computer readable medium.

SUMMARY OF THE INVENTION

According to an aspect of the invention, a two-dimensional code generating apparatus includes a two-dimensional code generating unit. The two-dimensional code generating unit that generates a two-dimensional code including a plurality of region symbols, a plurality of first pattern symbols, a plurality of second pattern symbols, and an information pattern. The region symbols represent a rectangular region in which one unit of the two-dimensional code is disposed, the rectangular region having a first side and a second side opposed to the first side. The plurality of first pattern symbols and the plurality of second pattern symbols are disposed along each side of the rectangular region and are disposed so that one of the first pattern symbols and one of the second pattern symbols disposed along the first side face the other of the first pattern symbol and the other of the second pattern symbol disposed along the second side. The information pattern is acquired by encoding information and is disposed within the rectangular region.

BRIEF DESCRIPTION OF THE DRAWINGS

Exemplary embodiments of the invention will be described in detail based on the following figures, wherein:

FIG. 10 is a functional block diagram of an image forming system;

FIG. 11 is a functional block diagram of a two-dimensional code reading apparatus.

DETAILED DESCRIPTION

Figure 1:
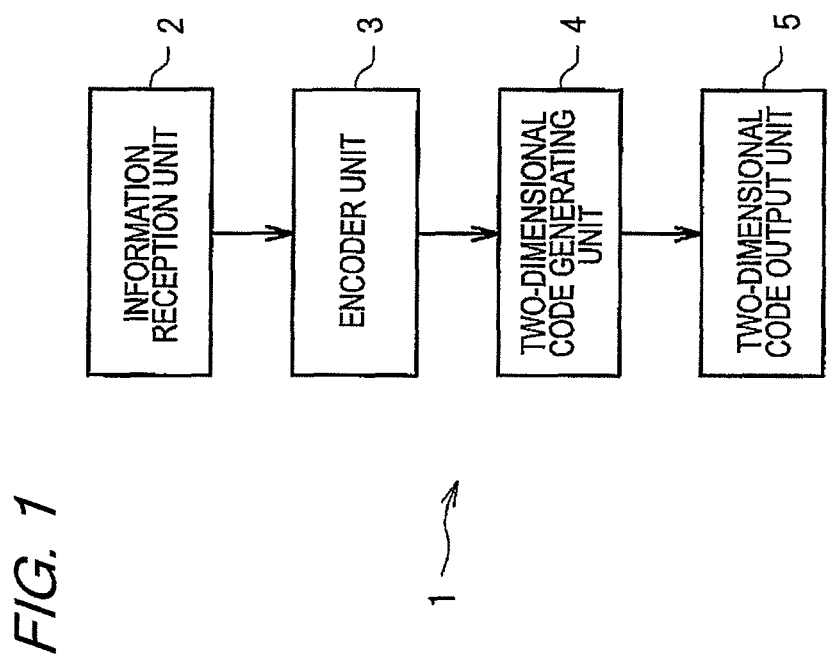
FIG. 1 is a functional block diagram of a two-dimensional code generating apparatus according to a first exemplary embodiment of the present invention.

FIG. 1 is a functional block diagram of a two-dimensional code generating apparatus 1 according to a first exemplary embodiment of the present invention.

The two-dimensional code generating apparatus 1 is physically implemented by using a general computer as a general-purpose information processing apparatus, which has a CPU (Central Processing Unit), a memory, and an input/output interface. By executing a computer program, which is used for operating the computer as the two-dimensional code generating apparatus 1, on the computer, the two-dimensional code generating apparatus 1 is virtually implemented. The computer program used for operating the computer as the two-dimensional code generating apparatus 1 may be provided by being recorded on an arbitrary information recording medium such as a DVD-ROM (DVD-Read Only Memory) or a CD-ROM (Compact Disk Read Only Memory) or may be provided as a computer-readable electric signal through a telecommunication line such as a public circuit line represented by the Internet. It is apparent that the information processing apparatus used for implementing the two-dimensional code generating apparatus 1 is not limited to a general computer and thus may be implemented by a micro controller. Alternatively, a dedicated apparatus by using a DSP (digital signal processor) or the like may be manufactured as the information processing apparatus. Furthermore, the two-dimensional code generating apparatus 1 may be configured as an apparatus that may be independently operated or may be configured as a module that is built in or added to office equipment such as a copier or a facsimile apparatus.

In addition, the functional blocks of the two-dimensional code generating apparatus 1 shown in FIG. 1 represent the two-dimensional code generating apparatus 1 implemented by a computer program with focusing on the functions thereof for the convenience of description. Thus, each functional block is not always necessary to exist physically.

An information reception unit 2 is an interface that receives information to be converted into a two-dimensional code from the outside. Any information reception unit 2 may be used as long as it receives information. In particular, the information reception unit 2 may be a so-called socket that performs the input/output of information between processes performed on the computer, a telecommunication line connected to a LAN (Local Area Network), a WAN (Wide Area Network) including a public line such as the Internet, or the like, an arbitrary information recording medium reading apparatus, or the like.

Here, a two-dimensional code recording means represents recording means in which information is binarized and disposed on the face thereof. Generally, the two-dimensional code is configured by a pattern in which dots of a predetermined number are disposed within a rectangular region in a regular arrangement having a lattice shape. In descriptions here, particularly, a pattern that is disposed within one rectangular region is referred to as one unit of a two-dimensional code. In addition, in a case where the information length of information to be converted into a two-dimensional code is longer than the information length embeddable in one unit of a two-dimensional code, the information may be divided and be stored into a plurality of units of the two-dimensional codes.

The shape of the rectangular region in which one unit of a two-dimensional code is disposed may be a rectangle or a square. In addition, the face on which the two-dimensional code is disposed is not limited to a planar face but may be a curved face.

An encoder unit 3 encodes the received information. It is preferable that the information is encoded by an error-correctable encoding method. As examples of such an encoding method, there are a Reed-Solomon code, a BCH code, and the like. Other than the above-described encoding method, the encoder unit 3 may perform Huffman coding in which information is compressed in advance so as to eliminate the redundancy and shorten the information length, a compression process using arithmetic coding or the like, a mask process that is used for uniformly distributing values of "1" and "0" in the encoded information, or the like.

The encoded information is transferred to a two-dimensional code generating unit 4 so as to generate a two-dimensional code.

Figure 2:
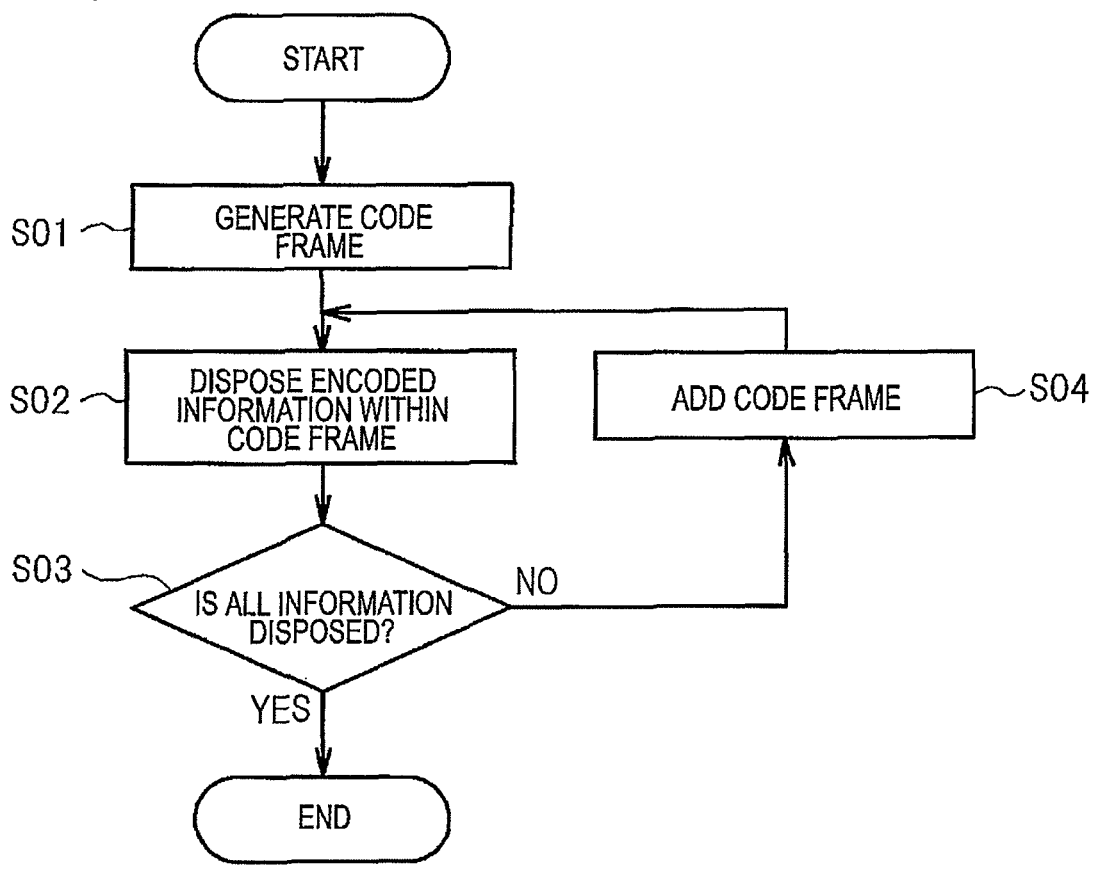
FIG. 2 is a flowchart representing a process of a two-dimensional code generating unit.

FIG. 2 is a flowchart representing a process of the two-dimensional code generating unit 4. When the encoded information is transferred, first in Step 501, the two-dimensional code generating unit 4 generates a code frame that becomes the frame of a two-dimensional code embedding information. The code frame, as will be described later, includes a symbol representing a rectangular region in which one unit of the two-dimensional code is disposed and first and second patterns that are disposed on the sides of the rectangular region. When the code frame is generated, subsequently in Step S02, the encoded information is disposed as an information pattern, which is a pattern of dots, within the code frame. Then, in Step S03, it is determined whether all the information is disposed within the two-dimensional code. This process determines whether there remains information that could not be disposed in a case where the information length of the encoded information is longer than that of information disposed in one unit of the two-dimensional code. In a case where all the information is disposed in one unit of the two-dimensional code, the two-dimensional code generating unit 4 ends the process. On the other hand, in a case where there is information that has not been disposed in the two-dimensional code yet, the process proceeds to Step S04, and a code frame of another unit of two-dimensional code is added to the two-dimensional code already generated. The position in which the code frame is added is arbitrary. Thus, the code frame is regularly added such that the code frame is adjacent to the two-dimensional code already generated, and the outer shape of the entire generated two-dimensional codes is fitted into a predetermined area or a predetermined width. When the code frame is added, the process is returned back to Step S02, and then the above-described process is repeated until all the information is disposed within two-dimensional code.

The operation of the two-dimensional code generating unit 4 that is represented here is only an example, and thus a different algorithm may be used. As examples of such algorithms, there are an algorithm in which the number of units of two-dimensional codes needed for storing encoded information is calculated in advance and code frames corresponding to a needed number are generated in advance, an algorithm in which all the needed two-dimensional codes are generated and then the two-dimensional codes are combined together instead of sequentially adding the code frames, and the like.

Described with reference back to FIG. 1, the generated two-dimensional codes are output from a two-dimensional code output unit 5. Any two-dimensional code output unit 5 may be used as long as it outputs the generated two-dimensional codes. Thus, for example, the two-dimensional code output unit 5 may be a socket that is an input-output interface, similarly to the information reception unit 2. The format of the two-dimensional code that is output is not particularly limited. Thus, the two-dimensional code is configured as image data such as a raster image.

Figure 3:
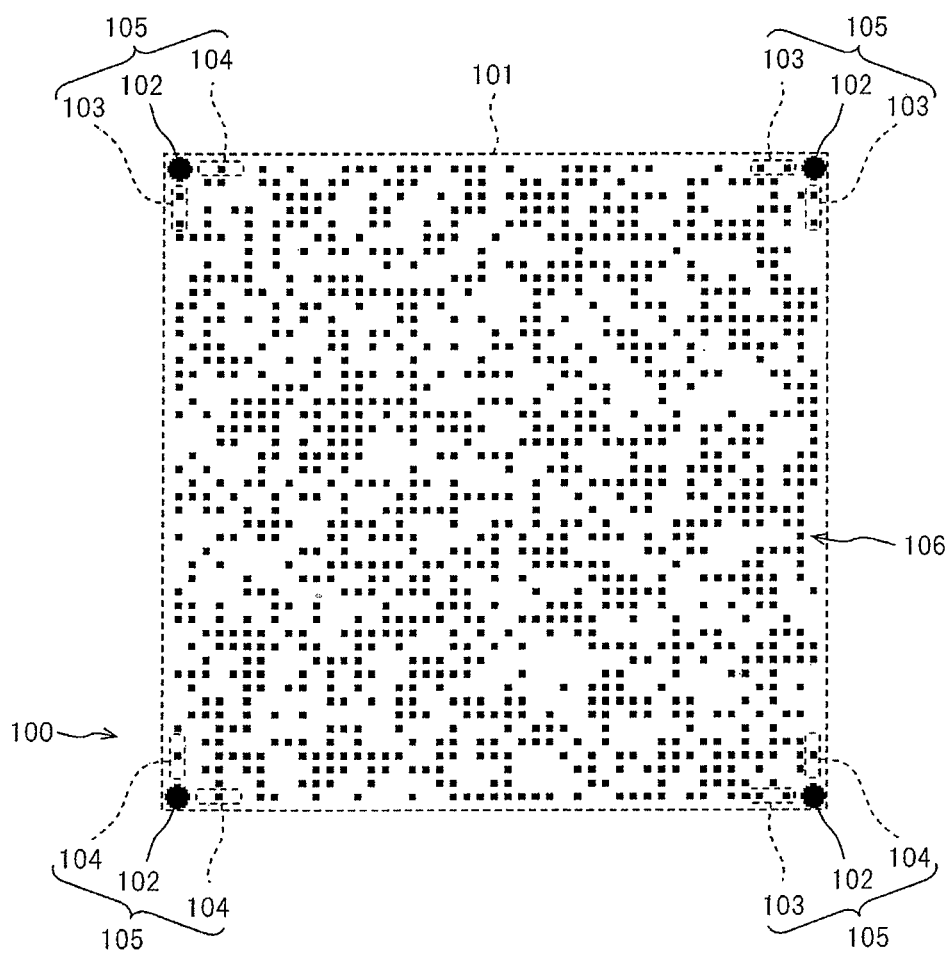
FIG. 3 is a diagram showing an example of a two-dimensional code of one unit that is generated by the two-dimensional code generating unit shown in FIG. 1.

Subsequently, two-dimensional codes that are generated by the two-dimensional code generating apparatus 1 according to this exemplary embodiment will be described in detail. FIG. 3 is a diagram showing an example of two-dimensional code 100 of one unit that is generated by the two-dimensional code generating unit 4 (see FIG. 1). Broken lines shown in the figure are lines attached for the convenience of description and do not configure parts of the pattern of the two-dimensional code 100.

An area denoted by a reference sign 101 is a rectangular region 101 in which the two-dimensional code 100 is disposed. Here, a square area, in which dots configuring the two-dimensional code 100 are disposed in the shape of a lattice of vertical 47 rows×horizontal 47 rows, is set as the area 101. However, the shape of the area 101 is not necessarily limited to a square and may be a rectangle. In addition, the number of each of the numbers of vertical and horizontal rows may be arbitrarily configured. In the two-dimensional code 100 shown here, a dot representing "0" as a value of one bit is represented by a blank in which a dot is not recorded, and a dot representing "1" as a value of one bit is represented by a black dot. However, the representation method is not necessary limited thereto. Thus, for example, the values of "0" and "1" may be represented by dots having different shapes or dots of different colors. In addition, the dot is not limited to represent one of binary values of "0" and "1". Thus, three values or more may be configured to be represented by one dot by using grayscales or colors.

On four corners of the area 101, landmark patterns 102 that are symbols representing the area 101 are disposed. The landmark pattern 102, as shown in the figure, is a black spot that is larger than a black spot that forms a different dot. By detecting the landmark patterns 102, the position of the area 101 is specified. Here, the shape of the landmark pattern 102 is not limited to a circle as shown in the figure. Thus, as the shape of the landmark pattern 102, any shape that can be distinguished from other dots so as to be detected may be used. Alternatively, the landmark pattern 102 may be formed by disposing a plurality of dots in a specific pattern. As such a pattern, for example, there is a pattern in which black spots are disposed in the entire area formed by vertical three rows× horizontal three rows or the like. In addition, the positions of the landmark patterns 102 are not limited to the four corners of the area 101. As an example of another disposition, the landmark pattern 102 may be disposed at a center point of each side of the area 101.

In addition, on each side of the area 101, at least one first pattern 103 and one second pattern 104 are disposed. In this exemplary embodiment, the first pattern 103 is a dot row representing "101", and the second pattern 104 is a dot row representing "010". In addition, on each side, one first pattern 103 and one second pattern 104 are disposed. The arrangement of the first pattern 103 and the second pattern 104 will be described later.

The code frame 105 is configured by the landmark pattern 102, the first pattern 103, and the second pattern 104. The code frame 105 is common to different two-dimensional codes in which different information is embedded. In the area 101, an information pattern 106 in which information is embedded is disposed in an area other than the code frame 105. In this exemplary embodiment, information of 2181 bits acquired by excluding 28 bits occupied by the code frame from vertical 47 rows×47 horizontal rows is embedded in the information pattern 106.

Figure 4:
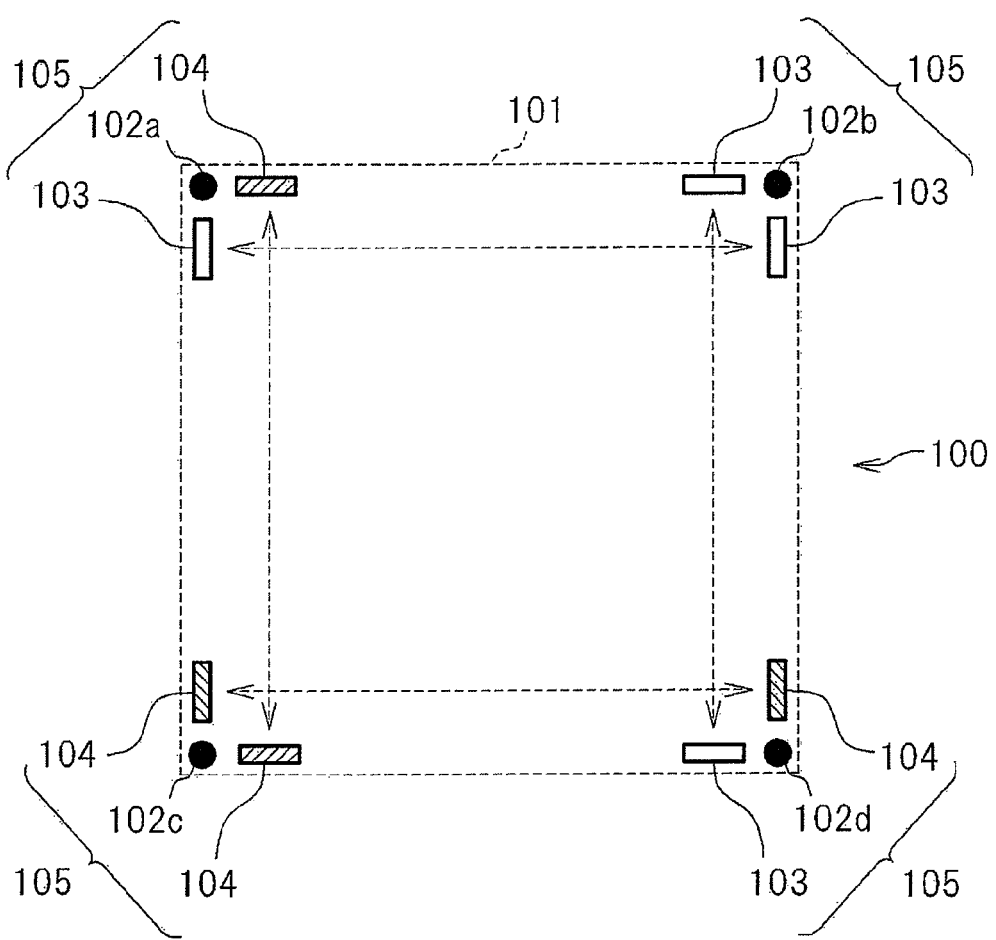
FIG. 4 is a diagram showing only a code frame of the two-dimensional code.

FIG. 4 is a diagram showing only the code frame 105 of the two-dimensional code 100. In the figure, in order to differentiate four landmark patterns, reference signs 102a to 102d are assigned to the landmark patterns. In addition, the first pattern 103 is denoted by a white rectangle, and the second pattern 104 is denoted by a rectangle to which hatching is added. As shown in FIG. 4, the first pattern 103 and the second pattern 104 are located adjacent to the landmark patterns 102a and 102d. In addition, two first patterns 103 are located adjacent to the landmark pattern 102b, and two second patterns 104 are located adjacent to the landmark pattern 102c. By utilizing the above-described disposition, the direction of the two-dimensional code 100 is specified.

In other words, when the two-dimensional code 100 is read in by a two-dimensional reading apparatus (to be described later), the direction of the rotation of the two-dimensional code 100 is not always clear all the time. At this moment, when focusing on any one landmark pattern 102 (it is not clear which one of 102a to 102d is the landmark pattern), and two of the first patterns 103 and/or the second patterns 104 located adjacent thereto are identified, it is determined that the focused landmark pattern 102 is which one of the landmark patterns 102a to 102d based on the disposition. For example, in a case where both the patterns located adjacent to the focused landmark pattern 102 are the first patterns 103, the landmark pattern 102 is the landmark pattern 102b. On the other hand, in a case where both the patterns located adjacent to the focused landmark pattern 102 are the second patterns 104, the landmark pattern 102 is the landmark pattern 102c. In addition, in a case where the first pattern 103 and the second pattern 104 are located adjacent to the focused landmark pattern 102, the landmark pattern 102 is either the landmark pattern 102a or the landmark pattern 102d. However, the disposition of the first and second patterns 103 and 104 located adjacent to the landmark pattern 102a and the disposition of the first and second patterns 103 and 104 located adjacent to the landmark pattern 102d have the mutual relationship of a mirrored image. Accordingly, whether the landmark pattern 102 is the landmark pattern 102a or the landmark pattern 102d can be determined.

As described above, the condition for disposition of the first and second patterns 103 and 104 is that the disposition of patterns disposed along the sides facing each other are ordered so as to allow corresponding patterns to face each other. In other words, patterns having the positional relationship denoted by dotted arrows in the figure which are patterns facing each other are configured to be the same pattern.

Figure 5:
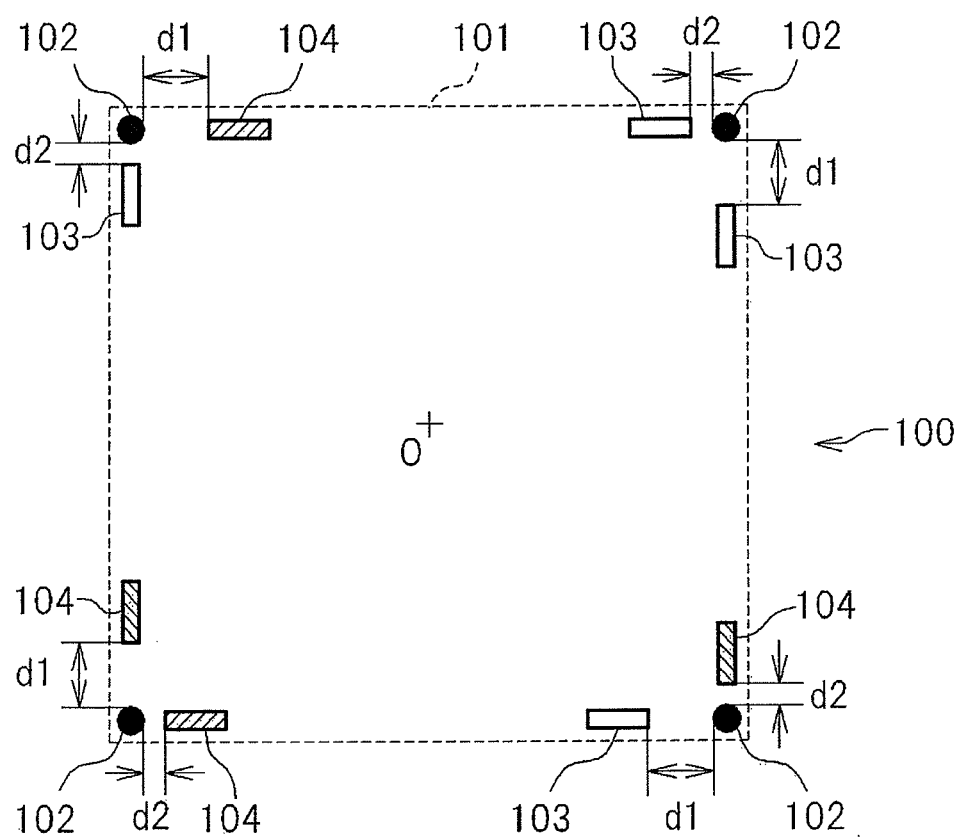
FIG. 5 is an example of the disposition of first patterns and second patterns.

Here, the positions of the first patterns 103 and the second patterns 104 along the sides will be described. First, it is preferable that the first patterns 103 and the second patterns 104, as shown in FIG. 5, are disposed in fourfold symmetrical positions with respect to the center O of the two-dimensional code 100. In other words, each distance d1 from the corner of the area 101 of the two-dimensional code 100 to the first pattern 103 or the second pattern 104 that is disposed for the first time in a position on the side along the clockwise direction is the same, and each distance d2 from the corner of the area 101 to the first pattern 103 or the second pattern 104 that is disposed for the first time in a position on the side along the counterclockwise direction is the same. In a case where the above-described disposition is implemented, when the two-dimensional code 100 is read out, the positions of the first pattern 103 and/or the second pattern 104 adjacent to an arbitrary landmark pattern 102 are fixed all the time regardless of the rotation angle of the two-dimensional code 100. Accordingly, the positions of the first patterns 103 and/or the second patterns 104 are determined based on the relative position from the landmark pattern 102.

Figure 6:
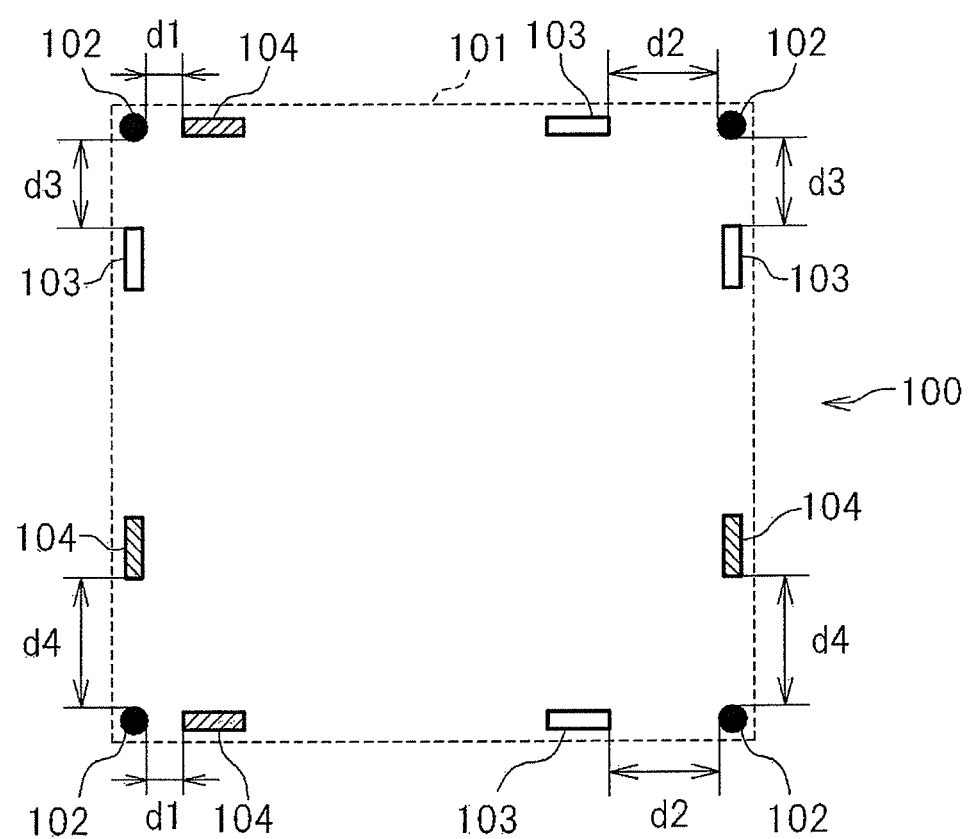
FIG. 6 is an example of the disposition of first patterns and second patterns.

In addition, as shown in FIG. 6, it is preferable that the first pattern 103 and the second pattern 104 are disposed in corresponding positions along the sides of the area 101 that face each other. In other words, the distances to the corresponding closest corners of the area 101 from the first patterns 103 or the second patterns 104 disposed in positions along the sides of the area 101 of the two-dimensional code 100 that face each other are the same. In other words, the distances denoted by d1 in FIG. 6 are the same. In addition, this applies also to d2, d3, and d4. In a case where such a disposition is implemented, when a plurality of the two-dimensional codes 100 are disposed to be adjacent to each other, along the adjacent sides thereof, the first pattern 103 and the second pattern 104 are shared by two two-dimensional codes 100.

Figure 7:
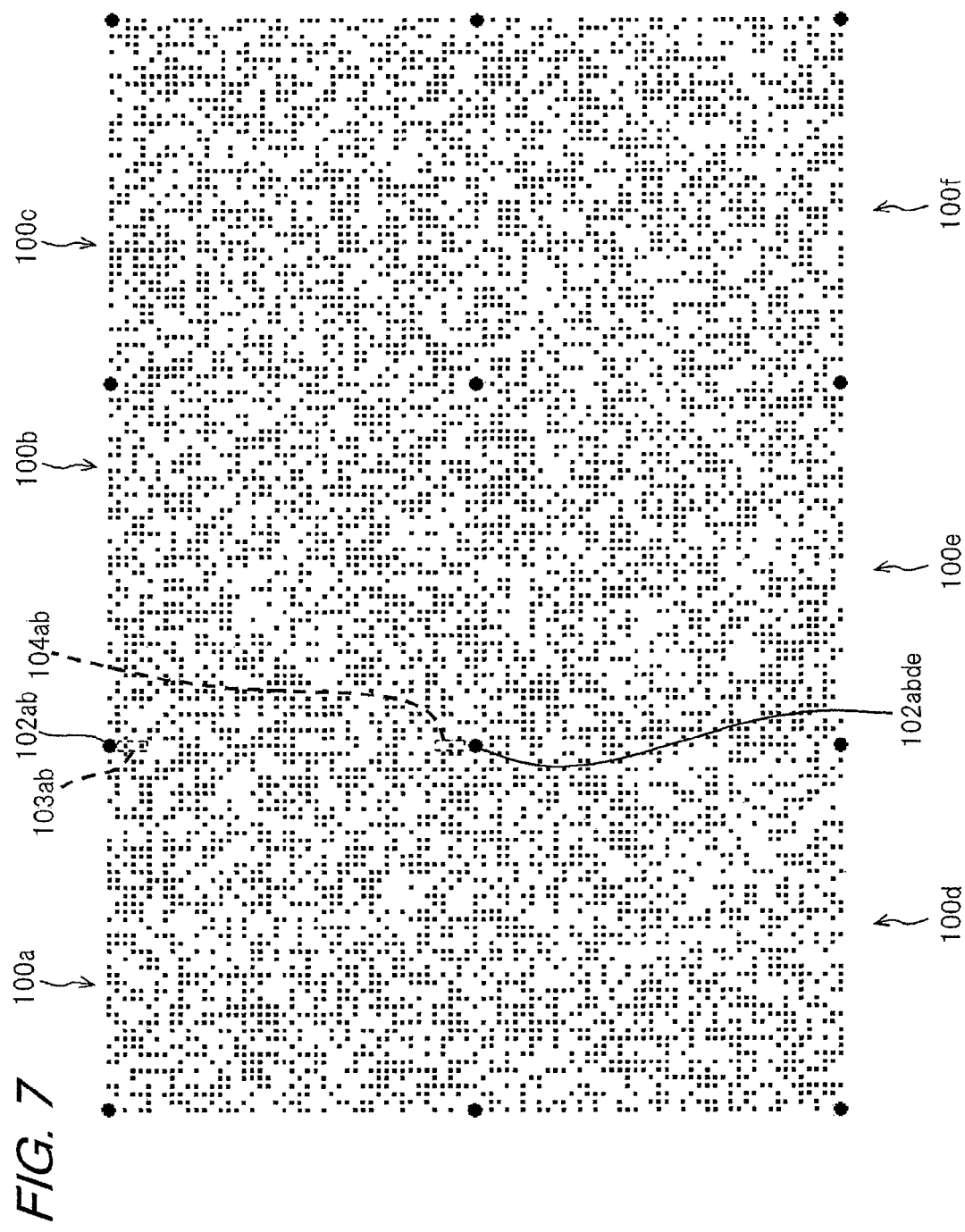
FIG. 7 is a diagram showing an example of a two-dimensional code acquired by adjacently disposing two-dimensional codes of six units.

FIG. 7 is a diagram showing an example of the two-dimensional code 100 acquired by adjacently disposing two-dimensional codes 100a to 100f of six units. In the figure, on the adjoining side of the two-dimensional code 100a and the two-dimensional code 100b, a landmark pattern 102ab, a first pattern 103ab, a second pattern 104ab, and a landmark pattern 102abde are shared by the two-dimensional code 100a and the two-dimensional code 100b. In addition, the landmark pattern 102abde is shared further by the two-dimensional code 100d and the two-dimensional code 100e. Accordingly, the first pattern 103ab that is denoted by a broken line in the figure is located on the right side of the two-dimensional code 100a and simultaneously is located on the left side of the two-dimensional code 100b in the figure. Thus, as described above with reference to FIG. 6, the first patterns 103 or the second patterns 104 disposed on the sides facing each other are disposed in positions precisely facing each other. This also applies to the second pattern 104ab and another first pattern 103 and another second pattern 104 that are not specified above.

In the description made with reference to FIGS. 5 and 6, the landmark patterns 102 are disposed on the corners of the area 101 in this exemplary embodiment. Thus, the distances from the first and second patterns 103 and 104 to the corner are denoted by distances to the landmark pattern 102.

In the two-dimensional code 100 shown in FIG. 6, as shown in FIG. 5, in order to dispose the first patterns 103 and the second patterns 104 in the fourfold symmetrical positions, d1, d2, d3, and d4 are set such that d1=d2=d3=d4. This is also a preferred disposition of the first patterns 103 and the second patterns 104.

Subsequently, the configuration of the first pattern 103 and the second pattern 104 will be described.

The first pattern 103 and the second pattern 104 having any configurations that can be distinguished from each other may be used. For example, it may be configured that the first pattern 103 is a dot representing "1", and the second pattern 104 is a blank representing "0". However, it is preferable that the first pattern 103 and the second pattern 104 are formed of bit rows of three bits or more. The reason for this is that a bit row of three bits or more has an error correction capability. A bit row of three bits has an error correction capability of one bit. The error is generated due to a defect at the time of generation of the two-dimensional code 100, contamination or damage in a medium on which the two-dimensional code 100 is stored, an error at the time of read-out, or the like. This error correction capability is increased as the number of bits of the bit row is increased.

In addition, it is preferable that the first pattern 103 and the second pattern 104 have bit-inverted relationship with each other. In such a case a Hamming distance between the bit row configuring the first pattern 103 and the bit row configuring the second pattern 104 is the maximum, and thereby the error correction capability for identifying the first and second patterns 103 and 104 from each other is increased.

In addition, it is preferable that the first pattern 103 and the second pattern 104 are formed from bit rows that have inversion symmetry. The first pattern 103 and the second pattern 104 of this exemplary embodiment represent "101" and "010" so as form inversion symmetry. As such patterns, there are "1001001" and "1010101" or the like. In such a case, the recognition of the first pattern 103 and the second pattern 104 does not depend on the read-in direction. This will be described with reference to FIGS. 8A and 8B.

Figure 8A:
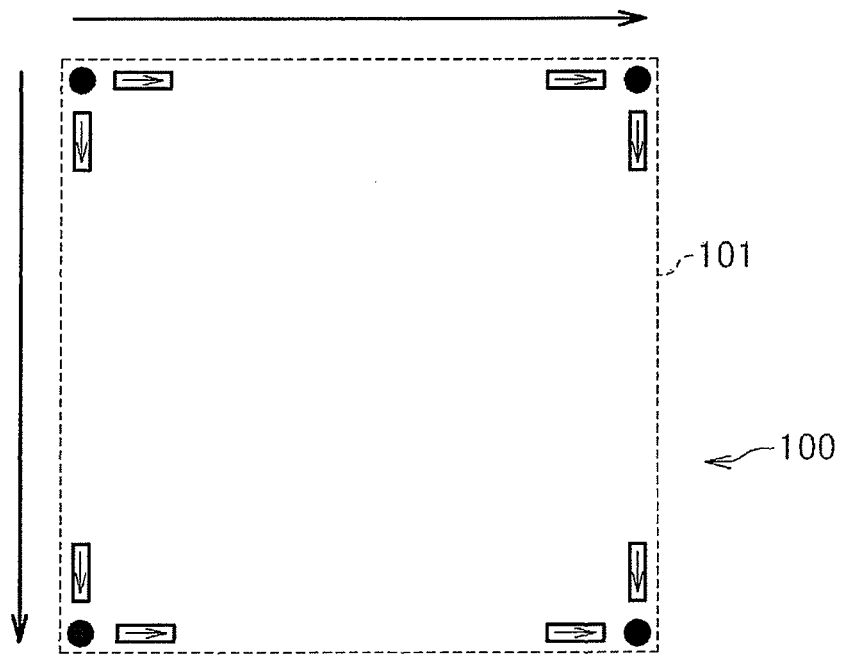
FIGS. 8A and 8B are diagrams showing the read-in direction and the bit row direction in a case where the two-dimensional code is rotated.

FIG. 8A represents a two-dimensional code 100. It is assumed that the read-in of bit rows is performed from the left side to the right side and from the upper side to the lower side, as denoted by arrows located on the outside of an area 101 in the figure. The bit rows of the first pattern 103 and the second pattern 104 are disposed in the same direction as the read-in direction of the bit rows, as denoted by arrows inside the rectangles representing the first and second patterns 103 and 104.

Figure 8B:
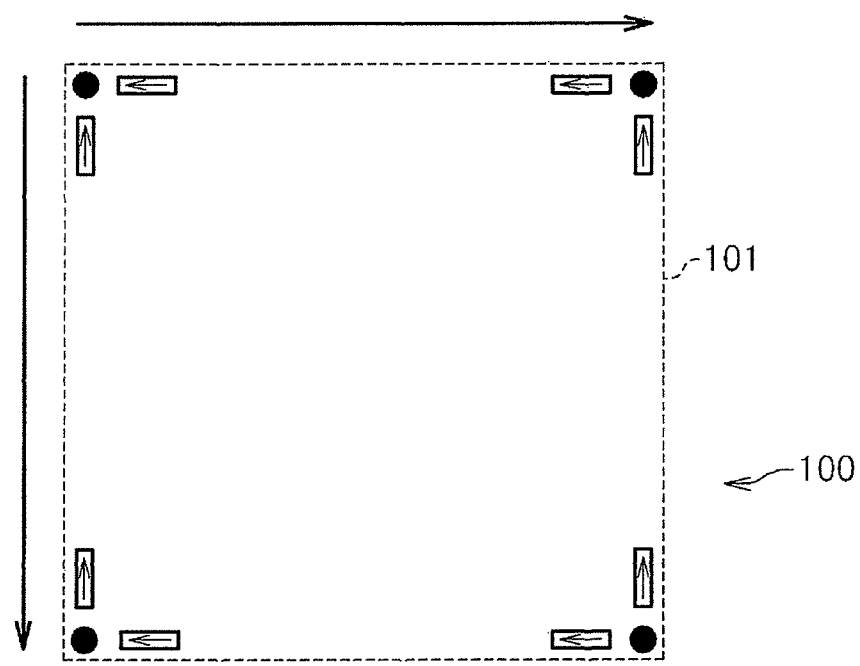

When the same two-dimensional code 100 is read in, in a case where the two-dimensional code 100 is rotated by an arbitrary angle, 180 degrees in this example, as shown in FIG. 8B, the read-in direction of the bit rows does not coincide with the direction of disposition of the bit rows configuring the first pattern 103 and the second pattern 104. In such a case, in order to recognize the first pattern 103 and the second pattern 104, the direction of the bit rows must be inverted. However, in the case, when the bit rows configuring the first pattern 103 and the second pattern 104 have inversion symmetry, such inversion does not need to be performed.

In addition, it is preferable that a difference between the number of bits, which have different values, included in the bit rows configuring the first pattern 103 and the second pattern 104 is equal to or less than one. This indicates that, in a case where the first pattern 103 and the second pattern 104 are configured by binary bit rows as in this exemplary embodiment, a difference in the number of "0" and the number of "1" that are included in the first pattern 103 is equal or less than one, and the same applies to the second pattern 104. In such a case, the numbers of "0" and "1" included in the first pattern 103 and the second pattern 104 are almost the same. Accordingly, when the two-dimensional code 100 is visually recognized, the first pattern 103 and the second pattern 104 are not visually distinguished.

Figure 9:
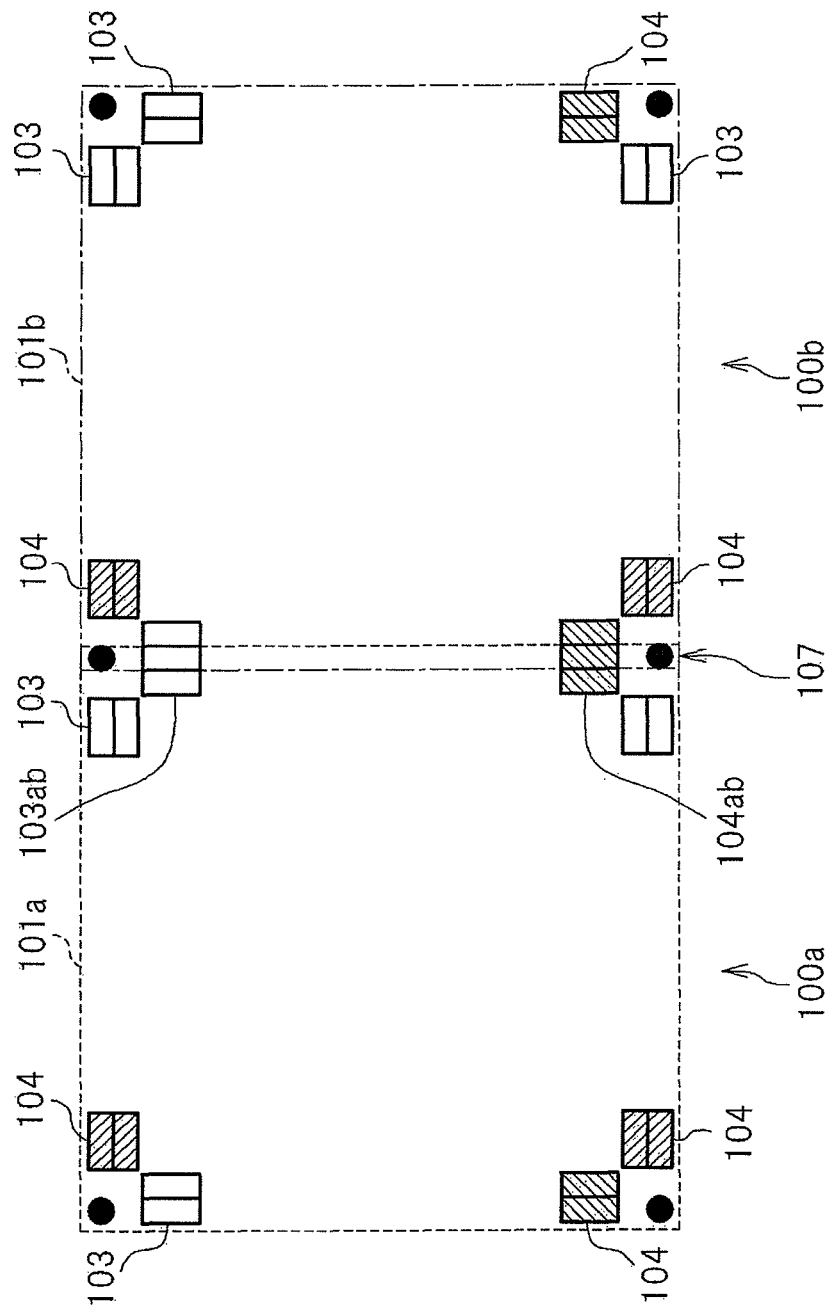
FIG. 9 is a diagram showing a two-dimensional code in which a first pattern and a second pattern are formed of bit rows having a plurality of rows.

Subsequently, FIG. 9 is a diagram showing a two-dimensional code 100 in which the first pattern 103 and the second pattern 104 are formed of bit rows having a plurality of rows. In the figure, the appearance in which a two-dimensional code 100a and a two-dimensional code 100b are disposed to be adjacent to each other is shown. In the figure, an area 101a in which the two-dimensional code 100a is disposed is denoted by a broken line, and an area 101b in which the two-dimensional code 100b is disposed is denoted by a dashed-dotted line. In the example shown in the figure, the first pattern 103 and the second pattern 104 are formed of bit rows of two rows. In such a case, in a position in which the two-dimensional code 100a and the two-dimensional code 100b are located adjacently to each other, a bit row 107 is shared by the two-dimensional codes 100a and 100b. Accordingly, on a side on which the first pattern 103 and the second pattern 104 are located adjacently to each other, the bit row, which is located on the bit row 107, of the bit rows of the first pattern 103ab and the second pattern 104ab is shared by the first pattern 103 and the second pattern 104 that are located adjacently thereto.

In addition, in this example, each of the first pattern 103 and the second pattern 104 is configured by bit rows of two rows. However, the present invention is not limited thereto. Thus, the first pattern 103 and the second pattern 104 may be respectively configured by bit rows of three rows or more. In addition, of the bit rows of the first pattern 103 and the second pattern 104, a bit row that is shared by two-dimensional codes located adjacent thereto is described as one row. However, the number of the bit rows shared by the two-dimensional codes may be two or more. Thus, at least one row needs to be shared. Generally, assuming that the first pattern 103 and the second pattern 104 are configured by bit rows of M rows, and the bit rows shared by adjacent two-dimensional codes are N rows (here, M and M are natural numbers equal to or greater one), a first pattern 103ab and a second pattern 104ab to which the two-dimensional code 100a and the two-dimensional code 100b are located in positions located adjacent are configured by bit rows of 2(M−N)+N=2M−N rows. In a case where N is an odd number, the first pattern 103ab and the second pattern 104ab are configured by bit rows of an odd row. On the other hand, in a case where N is an even number, the first pattern 103ab and the second pattern 104ab are configured by bit rows of an even row.

Subsequently, an image forming system 10 according to a second exemplary embodiment of the present invention will be described.

FIG. 10 is a functional block diagram of the image forming system 10. The image forming system 10 is a system that receives image information as electronic data and information to be converted into a two-dimensional code, generates the two-dimensional code, acquires a composed image by combining an image generated from the image information with the two-dimensional code, and forms the composed image on the surface of an arbitrary medium. Here, the image information may be any electronic data that becomes a basis for forming a visually recognizable image and, for example, may be document data, photo data, or the like. In addition, the medium has the surface on which an image is formed, and may be, for example, any of a paper sheet, a packaging material, a three-dimensional object such as a commercial product, and the like. In addition, an image forming method is not particularly limited. Thus, any image forming method for forming a visually recognizable image such as printing or laser marking may be used. In this exemplary embodiment, a case where document data is the image information and a printing system that prints a document on a paper sheet is used will be described as an example.

An image information reception unit 11 and an information reception unit 12 receive image information and information to be converted into a two-dimensional code from the outside. In other words, the image information reception unit 11 serves as image information reception means that receives the image information. In addition, the information reception unit 12 serves as disposition information reception means that receives information disposed in a rectangular region in which a two-dimensional code is disposed. The image information reception unit 11 may be any input interface receiving the image information and, for example, may be a socket, a telecommunication line, an information recording medium reading apparatus, or the like. In addition, the information reception unit 12 may be any input interface that receives information. When information for reception is received, individual information may be received for each image's information, or the image information as electronic data may be received as the information. Alternatively, predetermined information included in the image information may be received. The predetermined information included in the image information is not particularly limited. For example, the predetermined information may be text information included in the image information or the like.

The image information received by the image information reception unit 11 is converted into a raster image by an RIP 13 (Raster Image Processor), and the raster image is transferred to a composition unit 14. The information received by the information reception unit 12 is transferred to a two-dimensional code generating apparatus 1, and a two-dimensional code is generated. The two-dimensional code generating apparatus 1 is the same as that described above as the first exemplary embodiment. The generated two-dimensional code is transferred to the composition unit 14.

The composition unit 14 serving as composed image generating means that generates a composed image by composing the image acquired from the image information and the two-dimensional code together composes a raster image of an image and the two-dimensional code together so as to generate a composed image, and the composed image is transferred to a printer 15.

The printer 15 serving as image forming means prints the composed image on a paper sheet, and thereby forming an image. The formed image may be a monochrome image or a color image. In addition, the two-dimensional code is represented as a set of white points and black points each representing one-bit information configuring the two-dimensional code. The white points are formed by the background color of the paper sheet for which any printing is not performed, and the black points are formed by dots formed by performing printing. However, the present invention is not limited thereto. Thus, the white points or the black points may be formed as points of a different color (for example, red, blue, or the like). Furthermore, the black points may be formed with ink or toner of a color that is not visible though visible light or is difficult to be visually recognized, so that a two-dimensional code is not recognized to be included in a generated image at first glance. In such a case, the two-dimensional code may be formed in a blank area in which an image is not formed, or may be formed so as to be overlapped with a formed image. Furthermore, the two-dimensional code may be configured to be formed on the rear face of a paper sheet on which an image is formed.

According to such an image forming system 10, the medium, on which the two-dimensional code is provided, described in the first exemplary embodiment is acquired.

Subsequently, a two-dimensional code reading apparatus 20 according to a third exemplary embodiment of the present invention will be described.

FIG. 11 is a functional block diagram of the two-dimensional code reading apparatus 20.

The two-dimensional code reading apparatus 20 may be physically implemented by executing a computer program, which is used for allowing a computer to operate as the two-dimensional code reading apparatus 20, on the general computer as a general-purpose information processing apparatus. Alternatively, a dedicated apparatus may be manufactured, and such an apparatus may be configured to be able to be carried by a user.

An image acquisition unit 21 is image acquiring means that imports a two-dimensional code formed on a medium such as a two-dimensional code printed on the surface of a paper sheet as image data. In particular, a camera or a scanner may be used as the image acquisition unit 21. Alternatively, the image acquisition unit 21 may be an input interface that only receives image data acquired by an external apparatus.

A two-dimensional code recognizing unit 22 serves as two-dimensional code reading means that reads in a two-dimensional code. The two-dimensional code recognizing unit 22 recognizes a two-dimensional code included in the image data and extracts a bit row embedded in the two-dimensional code. At this time, the two-dimensional code recognizing unit 22 specifies the direction of the recognized two-dimensional code based on the disposition of a first pattern and a second pattern, and thereby serving as direction specifying means. This operation will be described later.

Since the bit row extracted from the two-dimensional code is encoded, the bit row is decoded by a decoder unit 23 so as to acquire information embedded in the two-dimensional code.

The decoded information is transferred to an information output unit 24 so as to be used for an arbitrary purpose. The purpose is not particularly limited. For example, in a case where encoded information added to a paper document is electronic data of the document, the electronic data of the document is acquired. On the other hand, in a case where the encoded information added to a security is electronic data that authenticates items written on the security, it can be checked whether the items written on the face of the security is counterfeited.

Figure 12:
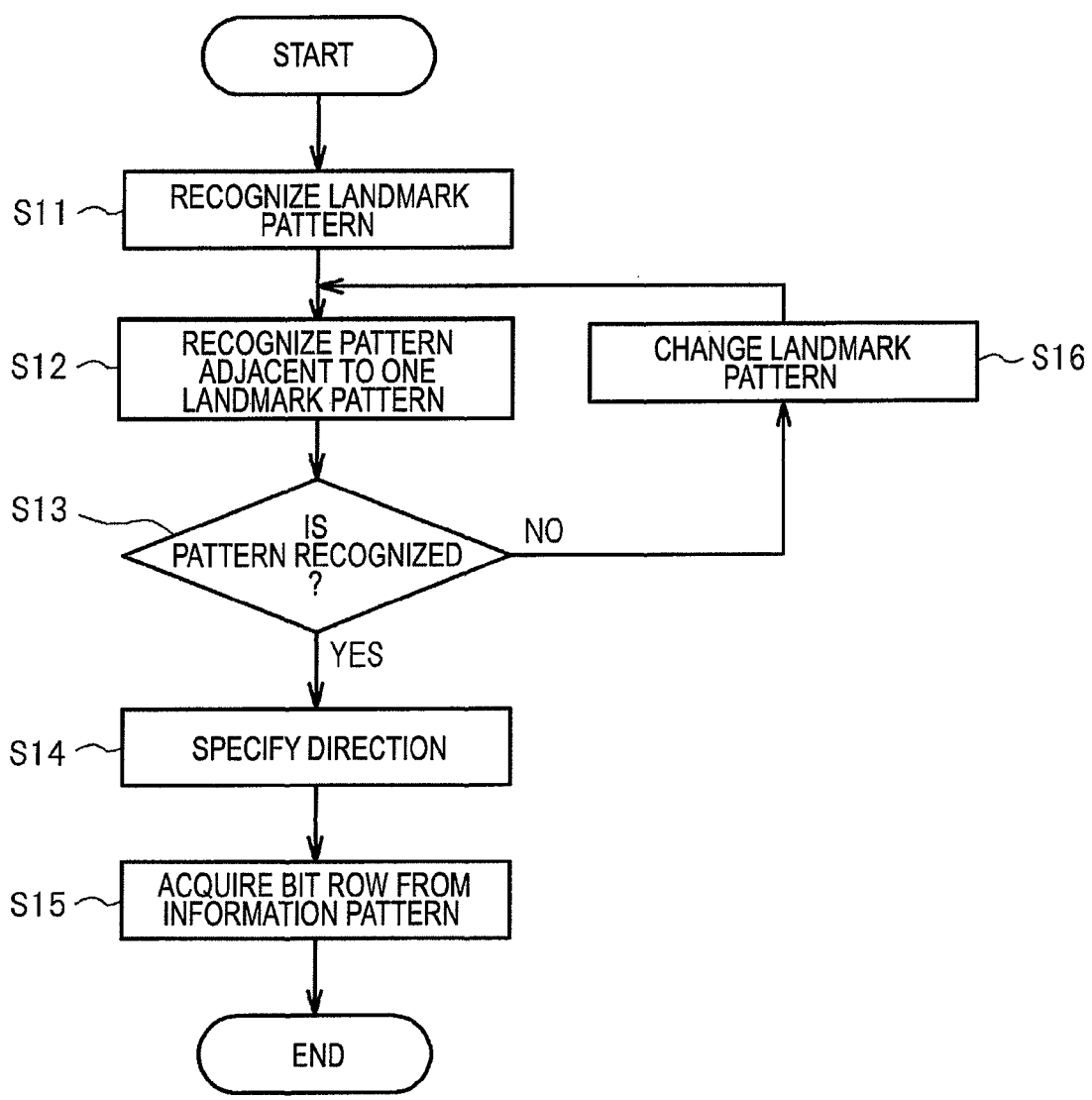
FIG. 12 is a flowchart representing the process of a two-dimensional code recognizing unit.

FIG. 12 is a flowchart representing the process of the two-dimensional code recognizing unit 22. The two-dimensional code recognizing unit 22, first, in Step S11, recognizes a landmark pattern included in an image acquired by the image acquisition unit 21. Accordingly, the position or the shape of an area in which the two-dimensional code is disposed, the number of units of the two-dimensional code included in the image, and the like are specified.

Subsequently, in Step S12, one landmark pattern is selected, and the first pattern and/or the second pattern disposed to be adjacent to the landmark pattern in directions perpendicular to each other are recognized.

Subsequently, in Step S13, it is determined whether the first pattern and/or the second pattern are correctly recognized. In a case where the pattern is not recognized, the process proceeds to Step S16. In Step S16, the selected landmark pattern is changed, and the process proceeds back to Step S12.

On the other hand, in a case where the first pattern and/or the second pattern are determined to be correctly recognized in Step S13, in Step S14, the position of the selected landmark pattern within the two-dimensional code is specified based on the disposition of the first pattern and/or the second pattern that have been recognized. Accordingly, the direction of the two-dimensional code is specified.

Then, in Step S15, a bit row is acquired from the information pattern included in the two-dimensional code in the specified direction, and the process is completed.

In addition, in this exemplary embodiment, a case where the landmark patterns are disposed on the four corners of the area in which the two-dimensional code is disposed has been described. However, in a case where the landmark patterns are disposed in different positions, as a reference for recognizing the first pattern and/or the second pattern, the coordinates of corners of the area in which the two-dimensional code is disposed may be used instead of the landmark pattern.

The functional blocks represented in the above-described embodiments are examples for performing the embodiments. Thus, the configurations or the dispositions of the functional blocks are not limited to the examples. In addition, the flowcharts of the operations of the two-dimensional code generating unit 4 and the two-dimensional code recognizing unit 22 are represented as examples implementing the functions of the two-dimensional code generating unit 4 and the two-dimensional code recognizing unit 22. Thus, the operations of the two-dimensional code generating unit 4 and the two-dimensional code recognizing unit 22 are not limited thereto.

The foregoing description of the exemplary embodiment of the present invention has been provided for the purpose of illustration and description. It is not intended to be exhaustive or to limit the invention to the precise forms disclosed. Obviously, many modifications and various will be apparent to practitioners skilled in the art. The embodiments were chosen and described in order to best explain the principles of the invention and its practical application, thereby enabling other skilled in the art to understand the invention for various embodiments and with the various modifications as are suited to the particular use contemplated. It is intended that the scope of the invention be defined by the following claims and their equivalents.

What is claimed is:

1. A two-dimensional code generating apparatus comprising:
    a two-dimensional code generating unit that generates a two-dimensional code including:
        a plurality of region symbols that represent a rectangular region in which one unit of the two-dimensional code is disposed, the rectangular region having a first side and a second side opposed to the first side;
        a plurality of first pattern symbols that consist of a first pattern and a plurality of second pattern symbols that consist of a second pattern different from the first pattern, each side of the rectangular region having disposed thereon one of the plurality of first pattern symbols adjacent to one of the plurality of region symbols and one of the plurality of second pattern symbols adjacent to another one of the plurality of region symbols, the one of the first pattern symbols disposed along the first side faces another one of the first pattern symbols disposed along the second side and the one of the second pattern symbols disposed along the first side faces another one of the second pattern symbols disposed along the second side.

2. The two-dimensional code generating apparatus according to claim 1, wherein the two-dimensional code further includes another unit of the two-dimensional code that includes the first pattern symbol and the second pattern symbol disposed along the first side,
    the one unit and the other unit are adjacent to each other so that the first pattern symbol and the second pattern symbol disposed along the first side are shared by the one unit and the other unit, and
    an information pattern that acquired by encoding information and is disposed within the rectangular region is distributed in the one unit and the other unit.

3. The two-dimensional code generating apparatus according to claim 1, wherein each of a first pattern of the first pattern symbols and a second pattern of the second pattern symbols is configured by a bit row of three bits or more.

4. The two-dimensional code generating apparatus according to claim 1, wherein a relationship between the first pattern and the second pattern is a bit-inversion relationship.

5. The two-dimensional code generating apparatus according to claim 1, wherein the first pattern and the second pattern are formed of bit rows having inversion symmetry.

6. The two-dimensional code generating apparatus according to claim 1, wherein a difference between a number of bits of the first pattern and a number of bits of the second pattern is equal to or less than one.

7. The two-dimensional code generating apparatus according to claim 2, wherein each of the first pattern symbols and the second pattern symbols are configured by bit rows of a plurality of rows, and
    the one unit and the other unit are adjacent to each other so that at least one row of the first pattern symbols and the second pattern symbols are shared by the one unit and the other unit.

8. The two-dimensional code generating apparatus according to claim 1, wherein each of the first pattern symbols and the second pattern symbols is disposed in fourfold symmetrical positions with respect to a center of the rectangular region.

9. An image forming system comprising:
    an image information reception unit that receives image information;
    a disposition information reception unit that receives data information to be disposed in a rectangular region;
    the two-dimensional code generating apparatus that includes:
        a two-dimensional code generating unit that generates a two-dimensional code including:
            a plurality of region symbols that represent the rectangular region in which one unit of the two-dimensional code is disposed, the rectangular region having a first side and a second side opposed to the first side; and
            a plurality of first pattern symbols that consist of a first pattern and a plurality of second pattern symbols that consist of a second pattern different from the first pattern, each side of the rectangular region having disposed thereon one of the plurality of first pattern symbols adjacent to one of the plurality of region symbols and one of the plurality of second pattern symbols adjacent to another one of the plurality of region symbols, the one of the first pattern symbols disposed along the first side faces another one of the first pattern symbols disposed along the second side and the one of the second pattern symbols disposed along the first side faces another one of the second pattern symbols disposed along the second side,
    a composed image generating unit that generates a composed image by combining the two-dimensional code and an image acquired from the image information; and
    an image forming unit that forms an image on a medium based on the composed image.

10. A two-dimensional code reading apparatus comprising:
    a reading unit that reads the two-dimensional code, the two-dimensional code comprising:
        a plurality of first pattern symbols that consist of a first pattern and a plurality of second pattern symbols that consist of a second pattern different from the first pattern; and
        a plurality of region symbols that represent a rectangular region in which one unit of the two-dimensional code is disposed, the rectangular region having a first side and a second side opposed to the first side,
        wherein each side of the rectangular region having disposed thereon one of the first pattern symbols adjacent to one of the plurality of region symbols and one of the second pattern symbols adjacent to another one of the plurality of region symbols, the one of the first pattern symbols disposed along the first side faces another one of the first pattern symbols disposed along the second side and the one of the second pattern symbols disposed along the first side faces another one of the second pattern symbols disposed along the second side; and a direction specifying unit that reads (i) a region symbol among the plurality of region symbols, (ii) a first pattern symbol selected among the plurality of first pattern symbols and the plurality of second pattern symbols that is adjacent to the region symbol, and (iii) a second pattern symbol among the plurality of first pattern symbols and the plurality of second pattern symbols that is adjacent to the region symbol, and determines a direction of the two-dimensional code based on a disposition of the read region symbol, the read first pattern symbol, and the read second pattern symbol.

11. A computer readable medium storing a program causing a computer to execute a process for generating a two-dimensional code including:

a plurality of region symbols that represent a rectangular region in which one unit of the two-dimensional code is disposed, the rectangular region having a first side and a second side opposed to the first side; and a plurality of first pattern symbols that consist of a first pattern and a plurality of second pattern symbols that consist of a second pattern different from the first pattern, each side of the rectangular region having disposed thereon at least one of the plurality of first pattern symbols adjacent to one of the plurality of region symbols and at least one of the plurality of second pattern symbols adjacent to another one of the plurality of region symbols, the one of the first pattern symbols disposed along the first side faces another one of the first pattern symbols disposed along the second side and the one of the second pattern symbols disposed along the first side faces another one of the second pattern symbols disposed along the second side.

12. A computer readable medium storing a program causing a computer to execute a process for specifying a direction of a two-dimensional code including:

a plurality of region symbols that represent a rectangular region in which one unit of the two-dimensional code is disposed, the rectangular region having a first side and a second side opposed to the first side; and a plurality of first pattern symbols that consist of a first pattern and a plurality of second pattern symbols that consist of a second pattern different from the first pattern, each side of the rectangular region having disposed thereon at least one of the plurality of first pattern symbols adjacent to one of the plurality of region symbols and at least one of the plurality of second pattern symbols adjacent to another one of the plurality of region symbols, the one of the first pattern symbols disposed along the first side faces another one of the first pattern symbols disposed along the second side and the one of the second pattern symbols disposed along the first side faces another one of the second pattern symbols disposed along the second side, the process comprising:

acquiring (i) a region symbol among the plurality of region symbols of the two-dimensional code, (ii) a first pattern symbol selected among the plurality of first pattern symbols and the plurality of second pattern symbols that is adjacent to the region symbol of the two-dimensional code, and (iii) a second pattern symbol among the plurality of first pattern symbols and the plurality of second pattern symbols that is adjacent to the region symbol of the two-dimensional code; and specifying a direction of the two-dimensional code based on a disposition of the read region symbol, the read first pattern symbol. and the read second pattern symbol.

* * * * *